(12) United States Patent
Nayak

(10) Patent No.: US 7,440,235 B2
(45) Date of Patent: Oct. 21, 2008

(54) TAPE DRIVE APPARATUS WITH A HEAD ALIGNMENT SYSTEM

(75) Inventor: Ashok B. Nayak, Glendora, CA (US)

(73) Assignee: Certance LLC, San Jose, CA (US)

( * ) Notice: Subject to any disclaimer, the term of this patent is extended or adjusted under 35 U.S.C. 154(b) by 1 day.

(21) Appl. No.: 11/528,190

(22) Filed: Sep. 27, 2006

(65) Prior Publication Data

US 2007/0086119 A1 Apr. 19, 2007

(51) Int. Cl.
*G11B 5/56* (2006.01)
*G11B 21/24* (2006.01)

(52) U.S. Cl. .................................................. 360/291.3

(58) Field of Classification Search .............. 360/291.3, 360/291.2, 291, 290, 240
See application file for complete search history.

(56) References Cited

U.S. PATENT DOCUMENTS

| | | | | |
|---|---|---|---|---|
| 4,316,226 A | * | 2/1982 | Nakamichi et al. ....... | 360/291.3 |
| 4,638,392 A | * | 1/1987 | Akutsu .................. | 360/130.32 |
| 5,034,836 A | * | 7/1991 | DeMarti et al. ............. | 360/240 |
| 5,055,956 A | * | 10/1991 | Kaya et al. ................ | 360/291.3 |
| 5,146,377 A | * | 9/1992 | Baheri ...................... | 360/291.3 |
| 5,479,307 A | * | 12/1995 | Lee .......................... | 360/291.3 |
| 6,078,478 A | * | 6/2000 | Gavit ....................... | 360/291.3 |
| 6,229,674 B1 | * | 5/2001 | Todd ........................ | 360/261.1 |

* cited by examiner

*Primary Examiner*—Julie Anne Watko
(74) *Attorney, Agent, or Firm*—Baker Botts L.L.P.

(57) ABSTRACT

A tape drive apparatus is provided with a base plate and tape path components on this base plate. The apparatus includes a bracket that is adjustably coupled to the base plate, the path components carrying a magnetic head for reading and writing to a tape transported by the path components. Pre-loaded jackscrews of the adjustment couplings are rotated to adjust and lock the azimuth and zenith settings for the magnetic head. A separate penetration screw independently controls the penetration of the magnetic tape.

8 Claims, 9 Drawing Sheets

TAPE DRIVE APPARATUS WITH A HEAD ALIGNMENT SYSTEM

RELATED APPLICATIONS

This application claims priority to provisional application serial number 60/337,288, filed on Nov. 30, 2001, and utility application serial number 10/259,524, filed Sep. 30, 2002 now U.S. Pat. No. 7,133,262. Further, the disclosures of both these applications are incorporated herein by reference for all purposes.

FIELD OF THE INVENTIONS

The present invention related to the filed of tape drives, and more particularly, to systems for aligning the magnetic head of the tape drive apparatus.

BACKGROUND OF THE INVENTION

To perform an optimum magnetic recording on the tape drive apparatus, an accurate geometric relationship must be maintained between the path of the magnetic recording tape and the write-read gaps of the magnetic recording head. This geometric relationship is referred to as the "head alignment." The head alignment includes the head-to-tape relationship in three main orientations. The "azimuth" relates to the perpendicularity of the head-gap with respect to the path of the tape. The "zenith" relates to the tilt of the head with respect to the tape. The "penetration" refer's to the amount of penetration of the magnetic head into the path of the tape. This head penetration controls the wrap angle of the tape with respect to the contour of the magnetic recording head.

Due to the normal manufacturing tolerances of the components of the tape path and the head positioner of the tape drive head positioning apparatus, the location of the head-gap varies with respect to the tape path. In light of this, after assembly of the tape drive, it is very unlikely that the head will be precisely aligned to the tape path within the necessary alignment tolerances. Additionally, tape cartridges are often interchanged between drives. This requires that the data recorded on one cartridge on a tape drive must be able to be read by the same family of other tape drives. Hence, each of the tape drives needs to have its head properly aligned to provide consistency between the tape drives.

Normally, after the assembly of the head, positioner and the tape path components, it is common practice to set the head-alignment within the required limits. This alignment is set at the factory and is considered one of the most critical procedures in the assembly of the tape drive. However, although this should be considered a final step of the procedure, conventional practices have often required additional steps to lock the alignment into place. A concern with this is that the locking operation itself often causes the alignment to change and require repetition of the alignment setting operation.

Another problem present in conventional systems is the potential migration of the head or the head positioning system when the tape drive is subjected to a reasonable shock or vibration. When this occurs, the head alignment changes and affects the write-read performance of the tape drive. Conventional systems strictly rely on fasteners to keep the alignment in place and do not provide adequate protection to secure the alignments against a shock-vibration environment.

The increasing capacity of tape drives requires increasing accuracy of the alignment system. In order to achieve this increasing accuracy, the alignment offset must be measured precisely and then corrected using a predictable mechanism. The correction of the measured error to within a required accuracy requires a fine-resolution in the alignment system. Conventional systems use cams, for example, to set such alignments, but do not provide for the calibration of the cam rotation to correct certain skew amounts nor provide a mechanism for rotating these cams.

Another concern with the head alignment systems is the difficulty in re-setting alignments in conventional tape drives without incurring either a large amount of disassembly or without damaging the tape drive. For instance, certain conventional tape drives employ applying a permanent adhesive to bond ahead placing mechanism in place. If for any reason the alignment is not within the required specifications, the bond joint must be broken and in turn, the head may get damaged. In addition, application of the bonding agent near the head element is not a preferred procedure, as the adhesive may get deposited on the head surface and result in deterioration of write-read processes.

Another concert related to the head-aligning process is the potential affecting of the performance of some of the critical components of the tape drive. Certain conventional alignment processes will affect the performance of certain critical components of the tape drive. This can result in the reduction in the life of these components or hinder the performance of the system.

SUMMARY OF THE INVENTION

There is a need for a head-alignment system and process to align a magnetic recording head within a tape drive apparatus within the required limits, and have this setting be considered a final step of the procedure. Furthermore, a process and apparatus are needed to provide resistance against any reasonable shock and vibration. At the same time, it is desirable to provide for an accessible alignment mechanism that allows convenient access to reset the alignment without substantial disassembly or damage to the tape drive. Furthermore, a predictable and precise process and apparatus are needed to align the system with the fine resolution needs of modern high-capacity tape drives. There is also a need for a system that does not interface with any functional components of the tape drive or affect the performance of any tape drive components due to the setting requirements.

These and other needs are met by embodiments of the present invention which provide a tape drive apparatus with a head-alignment system, comprising a magnetic head and means for adjusting a spatial orientation of the head with respect to a magnetic tape. In certain embodiments of the invention, the means for adjusting is configured to adjust azimuth, zenith and penetration of the magnetic head with respect to a magnetic tape. In still further embodiments, the apparatus comprises a base plate, a tape transport apparatus on the base plate, a bracket that carries the magnetic head, and connectors that connect the brackets to the base plate by an adjustable distance.

The earlier stated needs are also met by other embodiments of the invention which provide a tape drive apparatus comprising a base plate, tape path components the base plate, and a bracket adjustably coupled to the base plate. The bracket carries a magnetic head for reading and writing to a tape transported to tape path components. Adjustment couplings couple the brackets to the base plate and are lockably settable to adjust and lock the spatial orientation of the magnetic head with respect to a tape transported by the tape path components. In certain embodiments of the invention, the adjustment couplings include upwardly extending posts on the bracket, with each post having a screwhole for receiving a screw. The adjustment couplings also include a spring concentrically surrounding each post and bearing at opposite ends of the spring against the bracket and the base to bias the bracket and the base away from each other. Screws extend through the base into each screw hole, with turning of the screws adjusting the spatial orientation.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to the head alignment apparatus and processes of conventional tape drive apparatus. These include aligning the head precisely in a controlled manner and maintaining the head alignment position in a procedure that does not require locking of any additional components. This is achieved, in part, by the present invention which provides a base plate that has tape path components on the base plate and a bracket that is adjustably coupled to the base plate. This bracket carries a magnetic head for reading and writing to a tape transported by a tape path component. The adjustment couplings couple the bracket to the base plate and are lockably settable to adjust and lock the spatial orientation of the magnetic head with respect to a tape transported by the tape path components. The adjustment couplings include upwardly extending posts on the bracket, with each post having a screwhole for receiving a screw. A spring concentrically surrounds each post and biases the bracket and the base away from each other. Screws extend through the base and into each screwhole. The turning of the screws adjusts the spatial orientation to adjust the zenith and the azimuth of the magnetic record head. A penetration screw independently adjusts the penetration of the magnetic head with respect to the magnetic tape and the wrap angle. Once adjusted, the screws maintain the spatial orientation, including the azimuth, zenith and penetration, of the magnetic head with respect to the magnetic recording tape. Further details will become more apparent in the following description.

Figure 1:
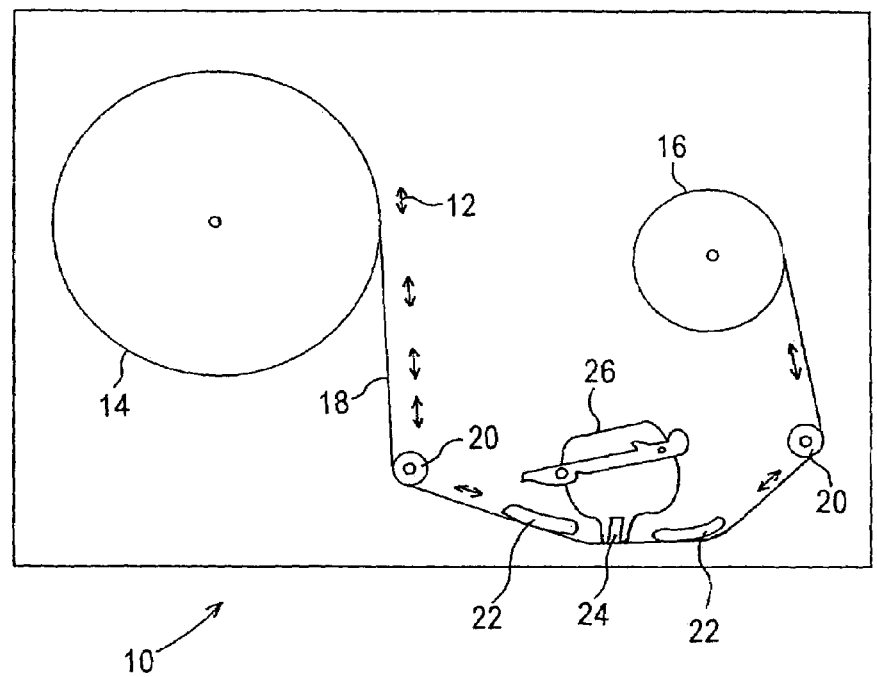
FIG. 1 is a top view, line diagram schematically depicting the tape path components of a tape drive apparatus constructed in accordance with the embodiments of the present invention.

FIG. 1 is a line diagram depicting exemplary tape path components to schematically show the tape transport path and the tape drive apparatus of the present invention. Other components, such as motors, gears, etc. are not depicted so as not to obscure the components of the tape transport path. The tape drive apparatus 10 includes a tape transport path 12 that is indicated by the arrows. Components of the tape transports path include the supply reel 14 of the tape cartridge and the take up reel 16 of the tape drive. The magnetic recording tape 18 is guided between the supply reel 14 of the tape cartridge and the take up reel 16 of the tape drive 10 by the guide rollers 20 and fixed tape guides 22. The tape 18 is transported past a magnetic head 24 is adjusted by a head positioner 26, which provides coarse and fine positioning. The alignment adjustments of the magnetic recording head 24 are provided by the head alignment apparatus as will be described below.

Figure 2:
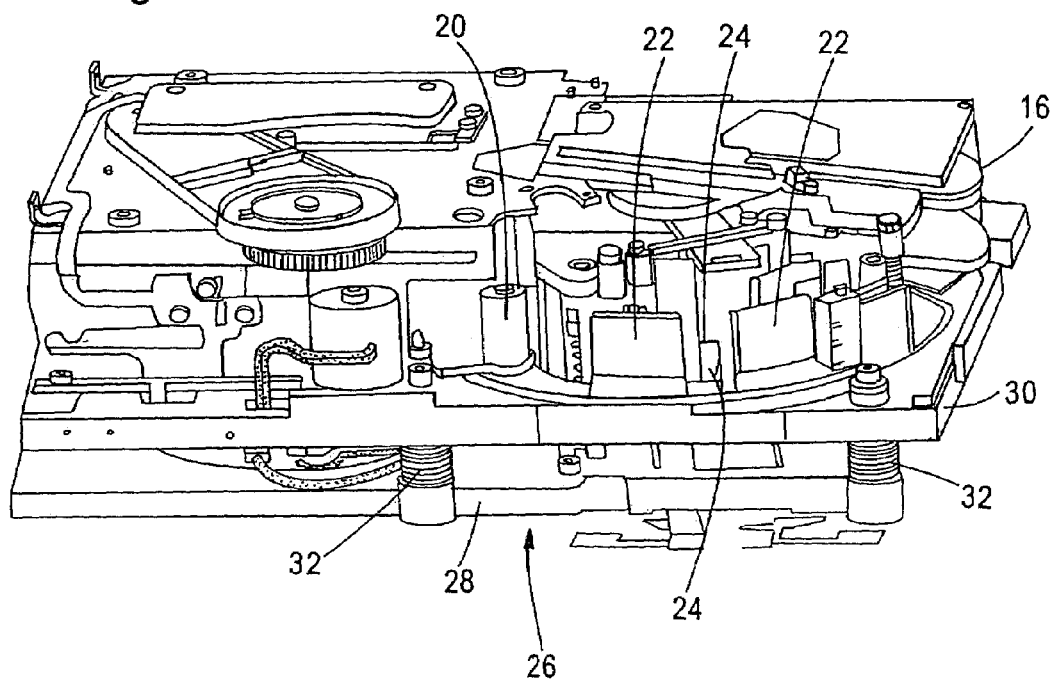
FIG. 2 is a perspective view of the internal components of a tape drive apparatus constructed in accordance with an embodiment of the present invention.

The head positioner assembly 26 has a bracket 28 as depicted in FIG. 2, that is attached to a base 30 of the tape drive apparatus 10. The bracket 28 is coupled to the base 30 by connectors (or "adjustment couplings") 32, which will be further described. The guide rollers 20 and fixed guides 22 may be seen in more detail in FIG. 2.

Figure 4A:
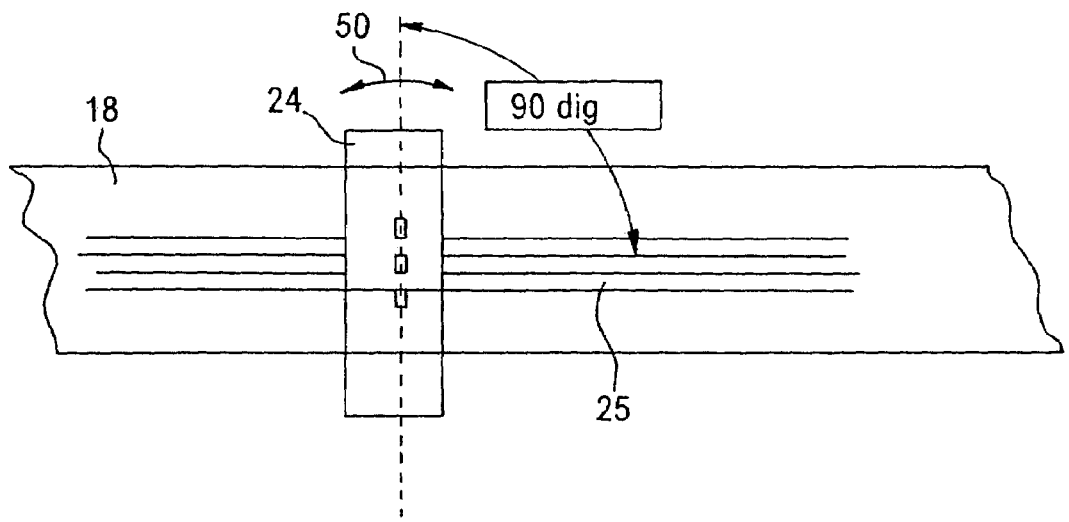
FIGS. 4A-4C schematically depict the alignment adjustments of the magnetic recording head in relation to the magnetic recording tape provided by the head alignment system in accordance with embodiments of the present invention.

In linear magnetic tape recording, the data is written as tracks that are parallel to the length of the tape or the tape path. The magnetic head 24 interfaces the tape 18 while the tape 18 is traversed at the necessary speed. The magnetic head 24 interfaces with tape 18 and the write/read elements (not shown) of the magnetic head 24 perform the function of data recording. The perpendicularity of the head-gap with respect to a data track is referred to as the "azimuth." This may best be seen in the schematic depiction of FIG. 4A, which provides a line diagram of the tape tracks and the head-gap relationship. By definition, the centerline of the head-gap of the magnetic head 24 should be perpendicular to the tracks 25 on the tape 18. Any offset from this 90° relationship is termed an azimuth error. For example, if the angle was 89°, a ~1° azimuth error is present. If the angle were 90.5°, the azimuth error would be +0.5°. With the present invention, the magnetic head 24 may be moved in the directions of arrows 50 to adjust the azimuth error.

Figure 4B:
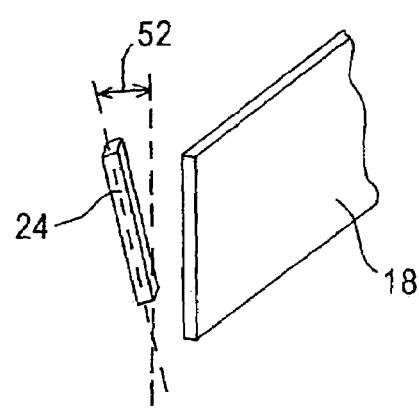

FIG. 4B schematically depicts a perspective side view of the magnetic head 24 and the tape 18 to illustrate a tilt of the magnetic head 24 with respect to the plane formed by the beam of the tape 18. Any tilt from parallel to the plane is referred to as the zenith. Movement of the magnetic head 24 in the direction of arrows 52 adjusts the zenith.

Figure 4C:
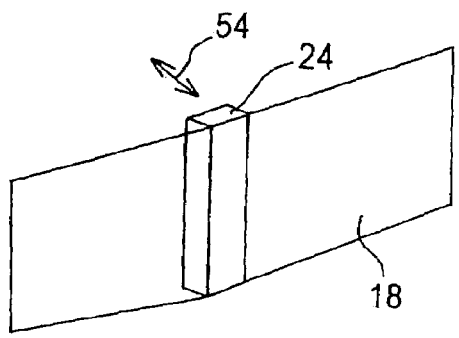

Finally, in FIG. 4C, the penetration of the magnetic head 24 into the tape path of the tape 18 forms the wrap angle. The penetration directions are indicated by arrows 54.

Figure 3:
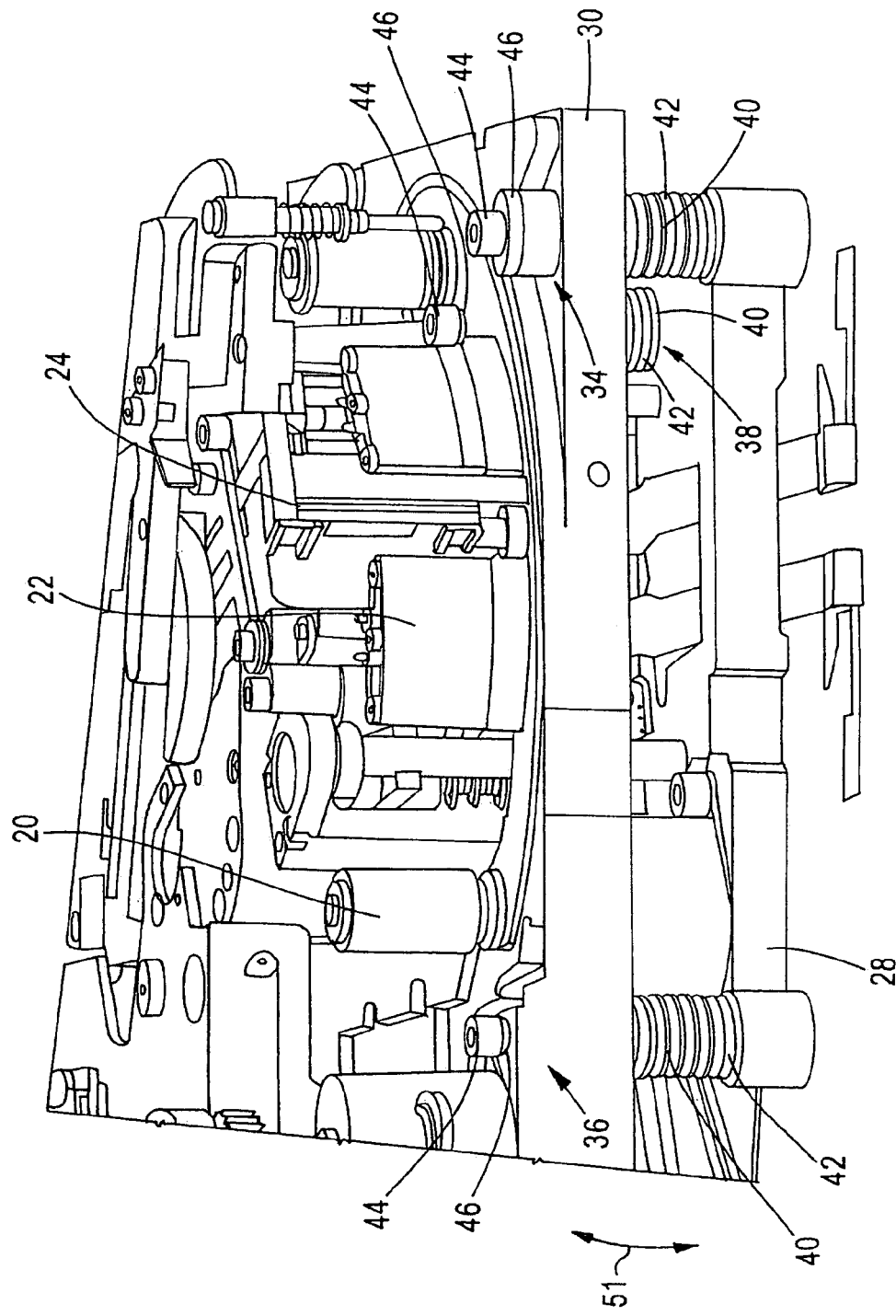
FIG. 3 is a detail of the internal components of the tape drive of FIG. 2, detailing the head alignment system.

The azimuth, zenith and penetration alignments must be within specified limits in order to perform successful magnetic recording. FIG. 3 depicts the head alignment apparatus in greater detail. The mechanism for penetration adjustment is obscured in FIG. 3.

The adjustment couplings 32 include a pivot point coupling 34, an azimuth adjustment coupling 36 and a zenith adjustment coupling 38. Each of the couplings 34, 36, 38 includes a cylindrical post 40 upwardly extending from the bracket 28. Each of the posts 40 has a spring 42 that concentrically surrounds the post 40. Although not shown in FIG. 3, each of the posts 40 has a central screwhole for receiving a screw.

Figure 12:
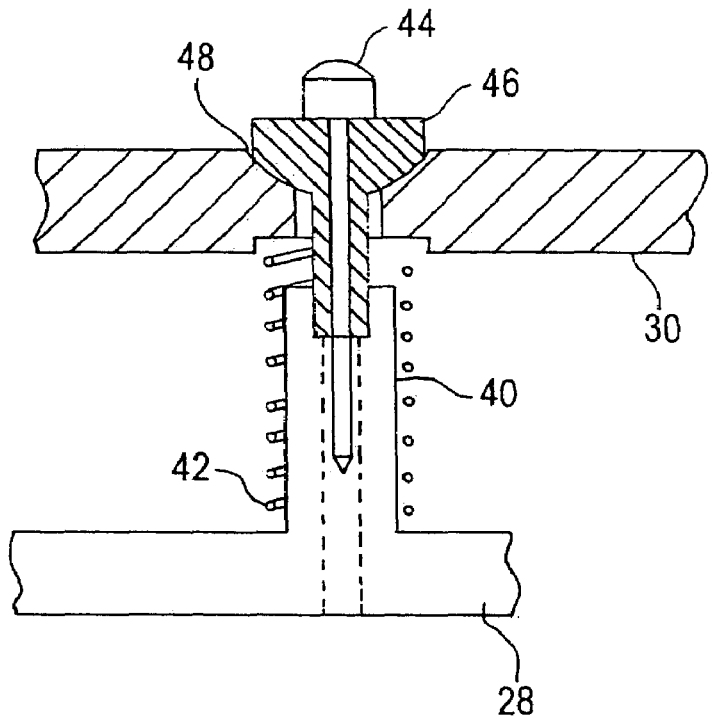
FIG. 12 is a cross-section of a pivot point coupling constructed in accordance with embodiments of the present invention.
Figure 13:
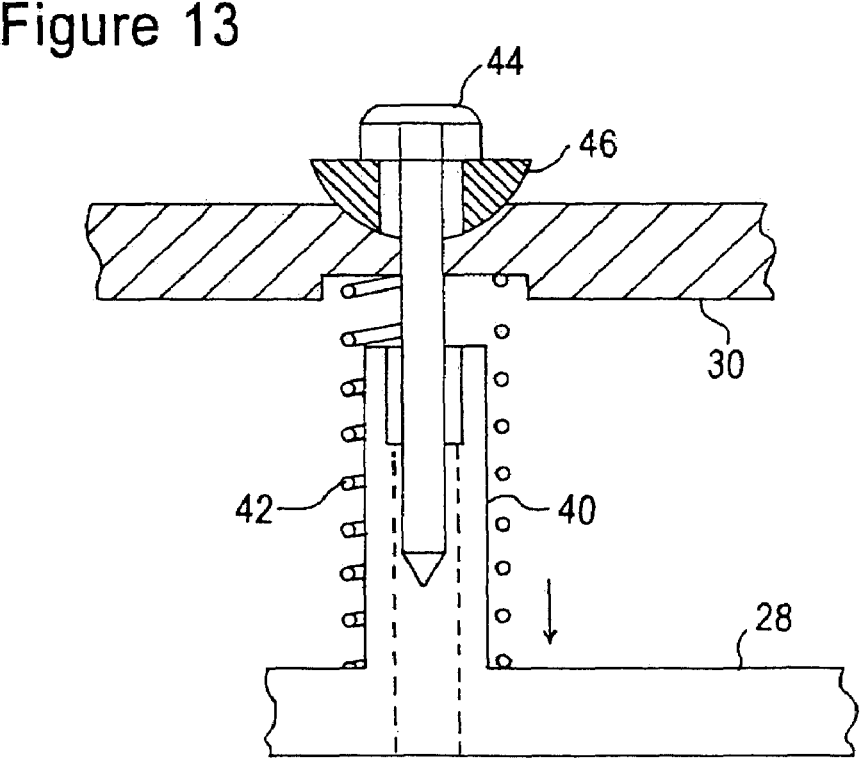
FIG. 13 is a cross-section of zenith adjustment coupling or an azimuth adjustment coupling constructed in accordance with embodiments of the present invention.

The pivot point coupling 34 has a different construction, as shown in the cross-section of FIG. 12, than the couplings 36 and 38, shown in cross-section in FIG. 13. In the pivot point coupling 34, the post 40 and the spherical washer 46 are in contact, so that there is no gap. By contrast, in the azimuth adjustment coupling 36 and the zenith adjustment coupling 38, the post 40 does not rest against the base 30 nor against the spherical washer 46. Hence, there is always a gap between the base 30 and the post 40 at these two couplings 36, 38.

Figure 5:
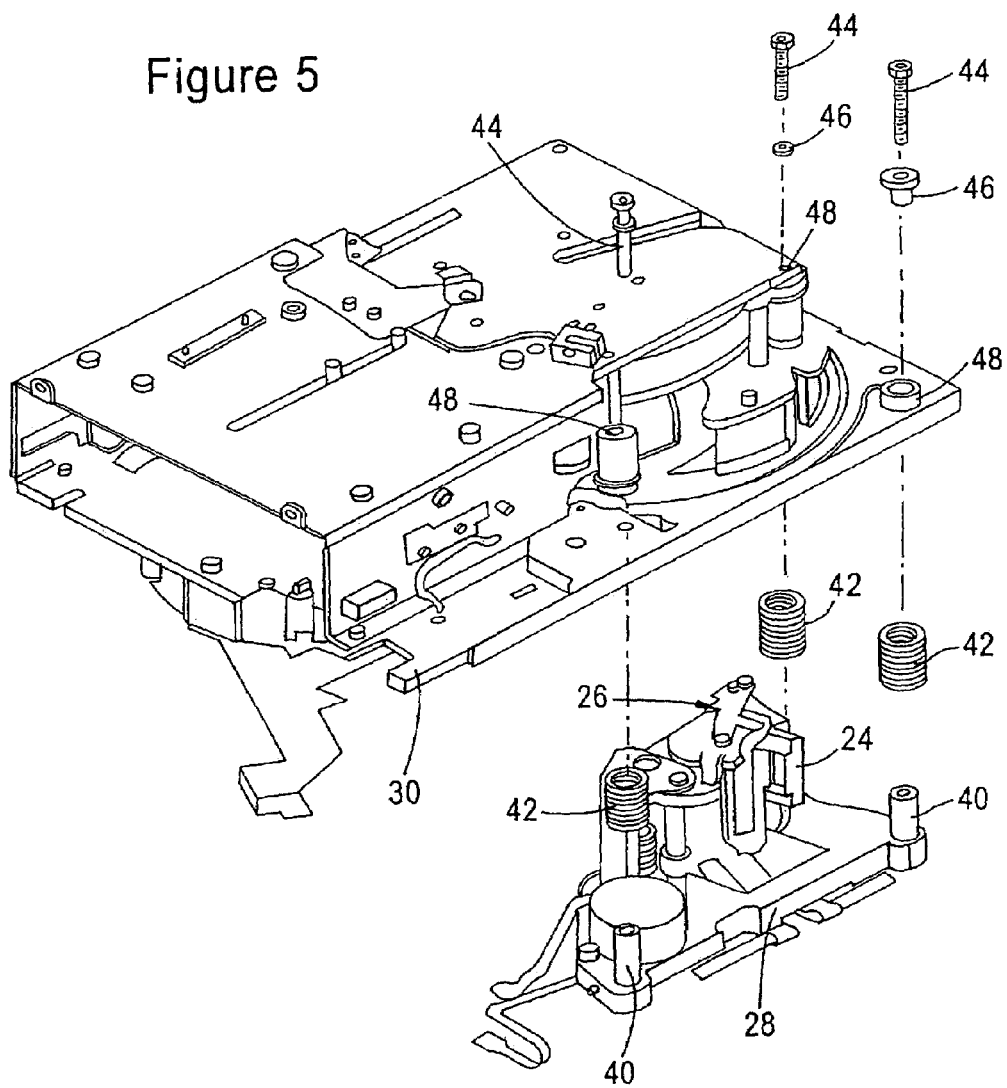
FIG. 5 is an exploded view of the internal components of the tape drive apparatus of the present invention, more clearly depicting the adjustment couplings of the head alignment system in accordance with embodiments of the present invention.

FIG. 5 shows an exploded view of the internal components of a tape drive assembly, and in particular, the adjustment couplings 32. With reference to FIGS. 5 and 2 the adjustment couplings 32 include screws, 44, such as jackscrews or other types of screws, which screw into the screwholes in the posts 40. The screws 44 extend through spherical washers, which seat within spherical seats 48. The spherical washers 46 provide resistance from any reasonable shook and vibration. The spherical washers, with spherical seats 48 and the preloading provided by the springs 42, prevents the alignment from moving after the alignment is set and secured against shock and vibration. The use of jackscrews acting as the alignment adjusting mechanism and use of spherical washers provide an added locking provision.

Referring back to FIG. 3, the pivot point coupling 34, once set, acts as a pivot for both the azimuth adjustment and the zenith adjustment. The azimuth adjustment is an especially critical adjustment, and in the exemplary embodiment, a long lever arm is provided between the pivot point coupling 34 and the azimuth adjusting coupling 36. For example, the distance between the pivot point coupling 34 and the azimuth adjustment coupling 36 may be over 100 mm, and in especially preferred embodiments in 102 mm.

In practice, once the pivot point coupling 34 is set, rotation of the screw 44 (e.g., a jackscrew) causes the bracket 28 to move about the pivot point coupling 34 in the direction of arrows 51 (i.e., essentially within the plane of the drawing sheet). Once the azimuth is precisely adjusted by rotation of the screw 44, the azimuth alignment is set and held in place by the screw 44 and the spherical washer 46 in combination with the spherical seat 48. The pre-loading of the screw 44 by the spring 42 prevents changing of the azimuth against reasonable shock or vibration.

Similarly, to the adjustment of the azimuth, the zenith adjustment coupling 38 is effected by rotation of the screw 44 of the zenith adjustment coupling 38. This causes the bracket 28 to be moved slightly in a plane orthogonal to that of the drawing around the pivot point coupling 34. The zenith of the magnetic head 24 will be thereby adjusted by a precise amount. After adjustment, the zenith alignment is held in place by the spherical washer 46, the spherical seat 48 and the pre-loading spring 42.

The azimuth alignment screw 44 has metric threads of the size M3x.50. Thus, the screw will translate the post 40 of the azimuth adjustment coupling 36 of the main bracket 28 by 0.50 mm per one revolution of the screw 44. The rotation occurs about the pivot point 34. With a 102 mm of lever arm between the azimuth adjustment coupling 36 and the pivot point coupling 34, there is a calculated resolution of 0.5 minutes of azimuth alignment for every 10° of rotation of azimuth screw 44. The zenith adjustment mechanics is similar, except that the lever arm between the screw 44 of the zenith adjustment coupling 38 and pivot point coupling 34 is 32 mm, in certain exemplary embodiments, although other lever arm sizes are possible. Thus, the resolution of the zenith is 1.5 minutes for every 10° of rotation of the zenith adjustment screw 44.

Each of the screws 44 is accessible from the topside of the drive apparatus 10. Hence, the alignment procedure may readily be one of the final assembly process steps for assembling the tape drive apparatus 10. Furthermore, in the event it becomes necessary to adjust the azimuth and zenith, removal of the top cover of the tape drive apparatus 10 and rotation of accessible screws 44 readily accomplish this.

There is a space between the base plate 30 and the top if the cylindrical protrusion of the main bracket 28 at the azimuth adjustment coupling 36. This allows the azimuth point to move up or down depending on the direction of rotation of the screw 44. The rotation of the bracket 28 occurs about the pivot point 34 as the azimuth point translates in either an up or a down notion.

Figure 6:
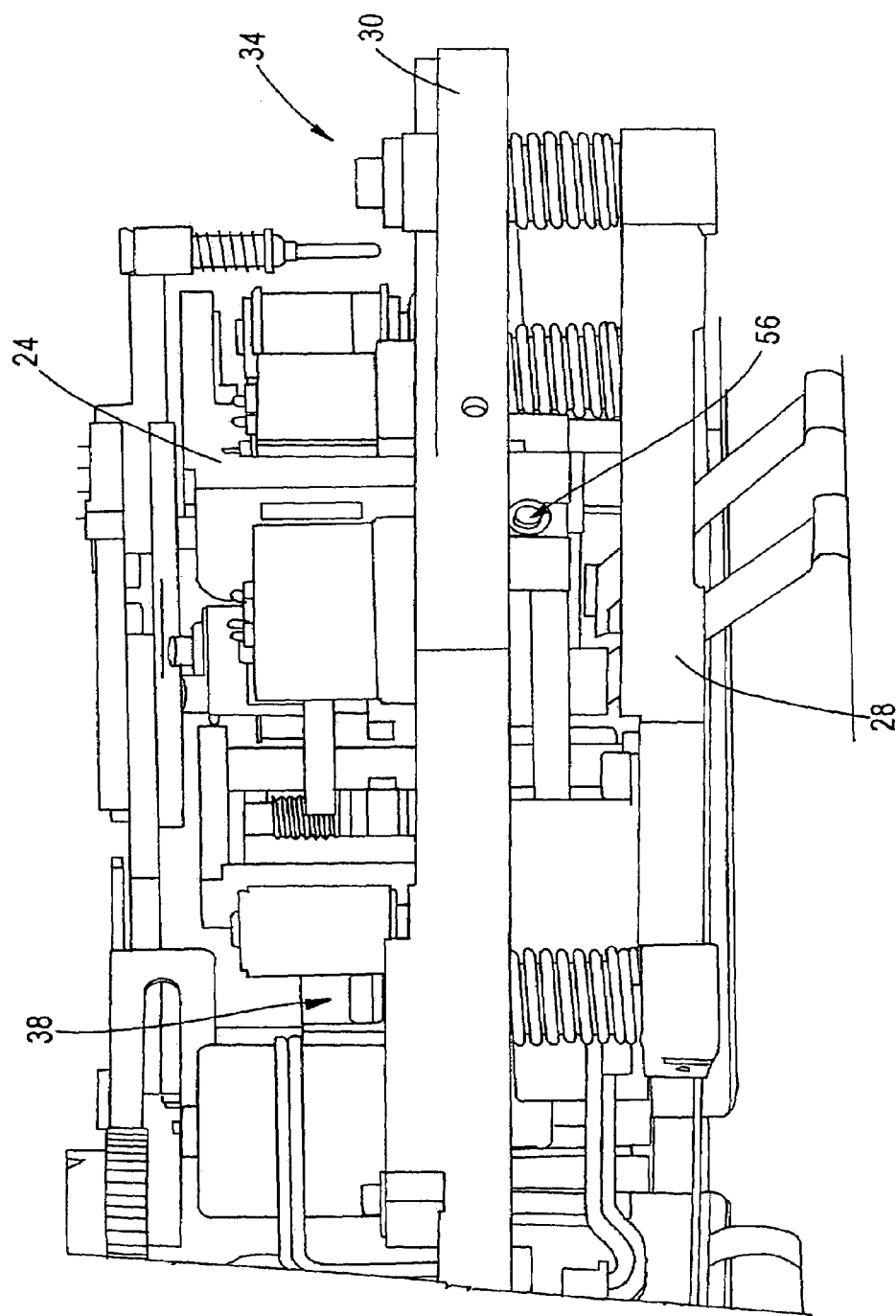
FIG. 6 is a detailed perspective view illustrating a penetration alignment screw of the head alignment system in accordance with embodiments of the present invention.

In addition to the alignment and zenith adjustments, the present invention provides for adjustment of the penetration of the head 24 into the path of the tape 18. FIG. 6 provides a different perspective view of the tape drive apparatus 10 of the present invention, showing a penetration screw 56 that adjusts the penetration of the magnetic head 24 into the path of the tape 18. The adjustment of the penetration is performed independently of the adjustment of the azimuth and zenith.

Figure 7:
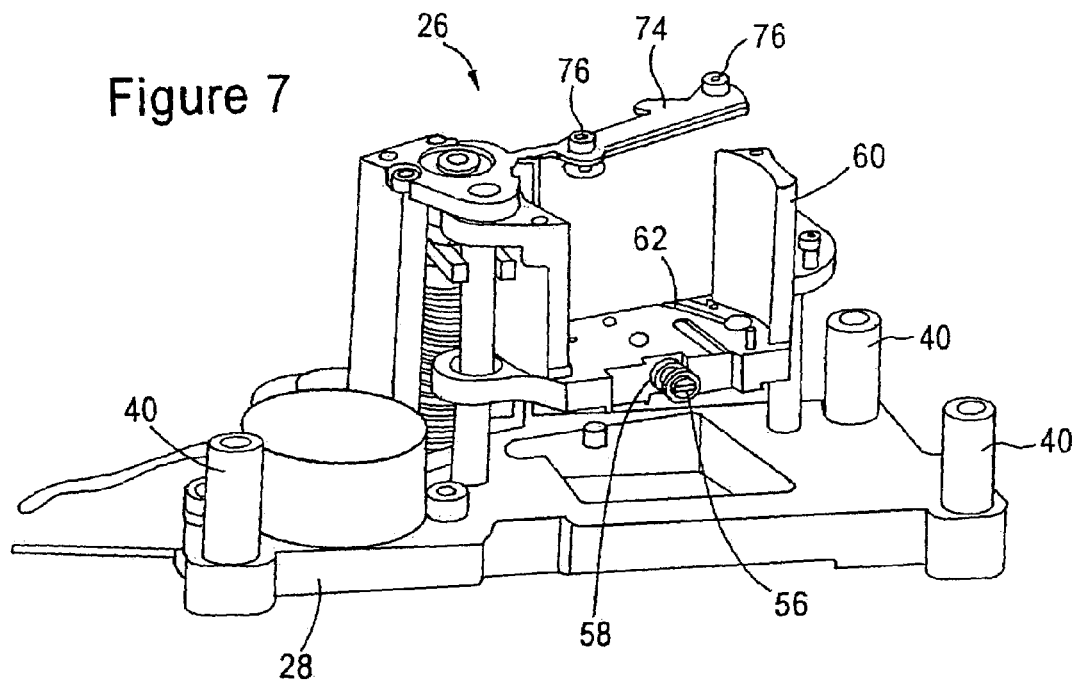
FIG. 7 shows a head positioner constructed in accordance with embodiments of the present invention.
Figure 8:
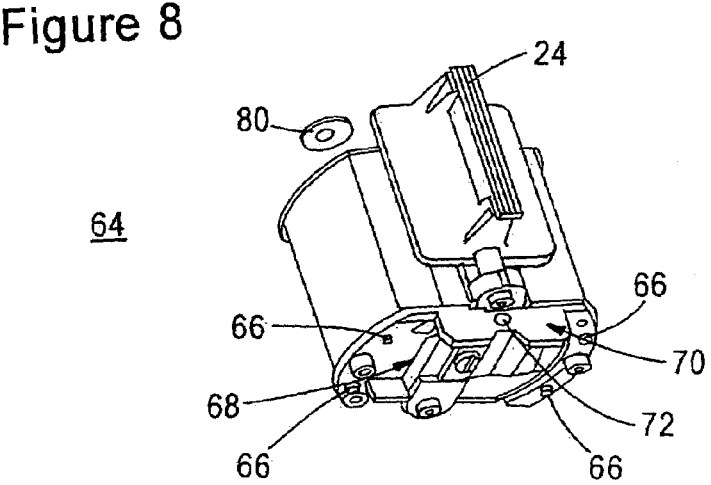
FIG. 8 depicts a fine positioner assembly with a flexure retainer attached thereto, in accordance with embodiments of the present invention.

FIG. 7 shows the head positioner 26 that includes the bracket 28 that carries a coarse positioner base 60. FIG. 8 depicts a fine positioner assembly 64 that carries a magnetic head 24. The fine positioner assembly 64 is carried on the coarse positioner base 60. The penetration alignment screw 56, which includes a circular groove 58, screws into the coarse positioner base 60.

Figure 10:
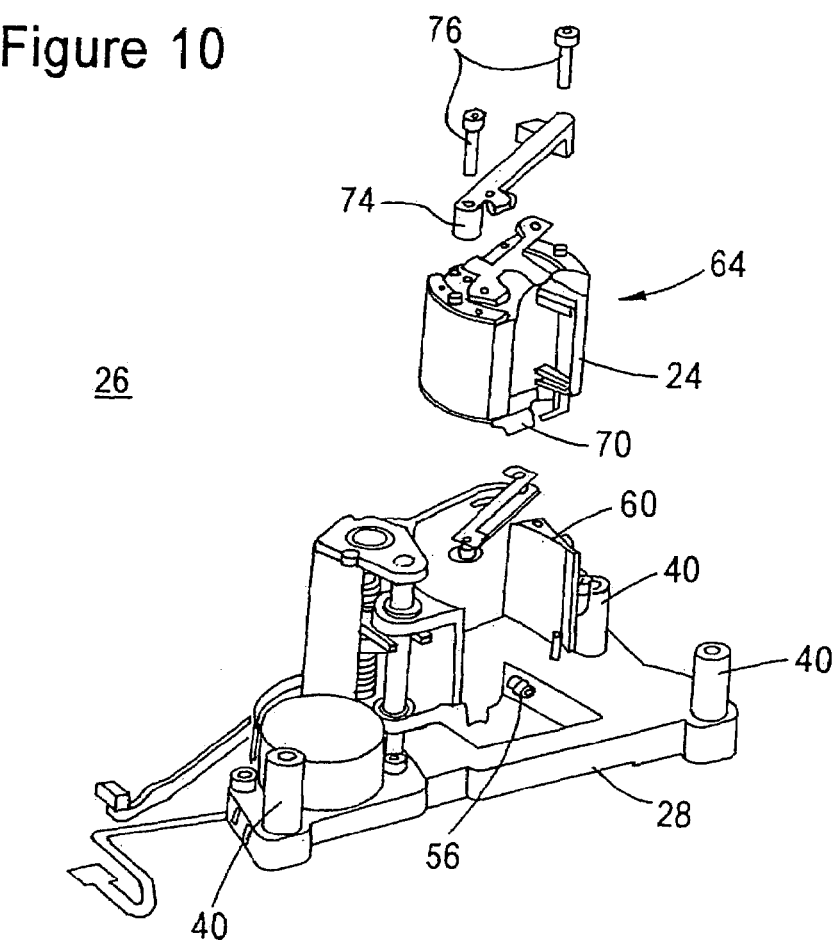
FIG. 10 is an exploded view of the head positioner assembly constructed in accordance with embodiments of the present invention.

As can be appreciated in FIGS. 8 and 10, the fine positioner assembly base 64 includes dowel pins 66 that are guided by dowel pin guide slots 62 located in the coarse positioner base 60. The fine positioner assembly 64 also includes a head-carriage suspension flexure 68 that is retained by a flexure retainer 70. The dowel pins 66 are located on the fine positioner assembly 64. The flexures and flexure retainer 70 are located on the fine positioner assembly 64 by the dowel pins 66. A feature for the penetration alignment 72, shaped as a notch or recess, is provided on the flexure retainer 70. When the fine positioner assembly 64 is assembled onto the coarse positioner base 60, the dowel pin 66 is received in the dowel pin guide slots 62. The circular grove 58 on the penetration screw 56 interacts with the feature 72 on the flexure retainer 70. Rotation of the penetration on screw 56 controllably moves the fine positioner assembly 64.

Once assembled as a single assembly, the entire fine positioner assembly 64, which includes the dowel pins 66, the flexure, and the flexure retainer 70, is translated to set the penetration of the head. Linear translation occurs via the interface between the slots 62 and the dowel pins 62. The slots 62 and the dowel pins 66 provide linear constraint.

Once properly positioned, screws 76 extending through a stabilizing bar 74 interact with screwholes 80 on the fine positioner assembly 64 to firmly lock down the position of the fine positioner assembly 64 on the coarse positioner base 60.

Figure 9:
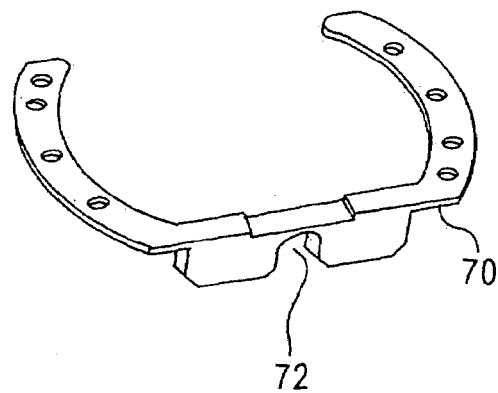
FIG. 9 shows the flexure retainer in isolation, in accordance with embodiments of the present invention.
Figure 11:
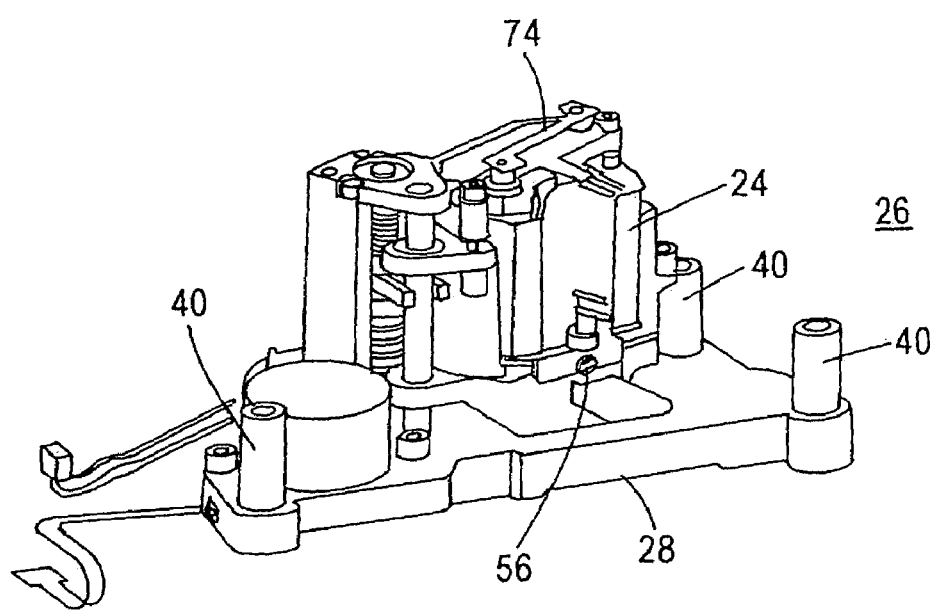
FIG. 11 shows the assembled head positioner assembly, in accordance with embodiments of the present invention.

FIG. 9 shows an embodiment of the flexure retainer 70 in isolation. FIG. 10 shows an exploded view of the head positioner assembly 26 in accordance with embodiments of the present invention. FIG. 11 depicts the head positioner assembly 26 after it has been assembled.

The present invention provides for the adjustment and locking of the spatial orientation of a magnetic head with respect to a tape transported by tape path components of a tape drive apparatus. This is achieved in a manner that is readily accessible, precise, and provides reasonable securement against unintended changes in the alignment.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A tape drive apparatus with head alignment system, comprising:
    a base plate;
    tape path components on the base plate;
    a bracket adjustably coupled to the base plate, wherein the bracket carries a coarse positioner base that carries a fine positioner assembly that carries a magnetic head for reading and writing to a tape transported by the tape path components;
    an alignment screw that screws into the coarse positioner base, wherein the screw, coarse positioner base, and fine positioner assembly are configured for adjusting the penetration orientation of the magnetic head with respect to a magnetic tape; and
    adjustable connectors that connect the bracket to the base plate, wherein the connectors are adjustable to change the azimuth and zenith spatial orientation of the magnetic head relative to the tape transported by the tape path components.

2. A tape drive apparatus comprising
    a base plate;
    tape path components on the base plate;
    a bracket coupled to the base plate, the bracket carrying a coarse positioner base, wherein the coarse positioner base further comprises a flexure retainer and dowel pin guide slots;
    a fine positioner assembly carried by the coarse positioner base, wherein the fine positioner assembly further comprises dowel pins;
    a magnetic head carried by the fine positioner assembly, wherein the magnetic head enables reading and writing to a tape transported by the tape path components;
    an alignment screw that screws into the coarse positioner base, wherein the screw is configured for interacting with a notch shaped feature of the flexure retainer and for moving the fine positioner assembly with its dowel pins received in the dowel pin guides; and
    means for adjusting the azimuth and zenith spatial orientation of the magnetic head with respect to the magnetic tape.

3. A tape drive apparatus comprising
    a base plate;
    tape path components on the base plate;
    a bracket coupled to the base plate, the bracket carrying a coarse positioner base that carries a fine positioner assembly that carries a magnetic head for reading and writing to a tape transported by the tape path components; wherein the coarse positioner base further comprises a flexure retainer and dowel pin guide slots, and wherein the fine positioner assembly further comprises dowel pins;
    an alignment screw that screws into the coarse positioner base, wherein the screw is configured for interacting with a feature of the flexure retainer and for moving the fine positioner assembly with its dowel pins received in the dowel pin guides and adjusting the penetration orientation of the magnetic head with respect to a magnetic tape; and
    means for adjusting the azimuth and zenith spatial orientation of the magnetic head with respect to the magnetic tape.

4. The apparatus of claim 3, wherein the means for adjusting the azimuth and zenith spatial orientation of the head further comprises a pivot point coupling, an azimuth coupling, and a zenith coupling between the base plate and the bracket and wherein each of the pivot point, azimuth, and zenith couplings are lockingly settable.

5. The apparatus of claim 4, wherein the tape drive apparatus has a top side and each of the pivot point, azimuth, and zenith couplings are accessible for adjustment from the top side.

6. The apparatus of claim 4, wherein the pivot point, azimuth, and zenith couplings each comprise
    an upwardly extending post on the bracket, the post having a screwhole for receiving a screw;
    a spring, concentrically surrounding the post, bearing at opposite ends of the spring against the bracket and the base plate to bias the bracket and the base plate way from each other; and
    a screw extending through the base plate and into each screwhole.

7. The apparatus of claim 6, wherein the pivot point, azimuth, and zenith couplings each include a spherical seat on the base plate and a spherical washer on the screw, such that the spherical washer interacts with the spherical seat.

8. The apparatus of claim 6, wherein the tape drive apparatus has a top side and each of the screws are accessible for turning from the top side.

\* \* \* \* \*